March 26, 1963   J. A. FITZPATRICK ETAL   3,082,666
METHOD AND APPARATUS FOR PROPULSION
Filed Feb. 6, 1959   11 Sheets-Sheet 3

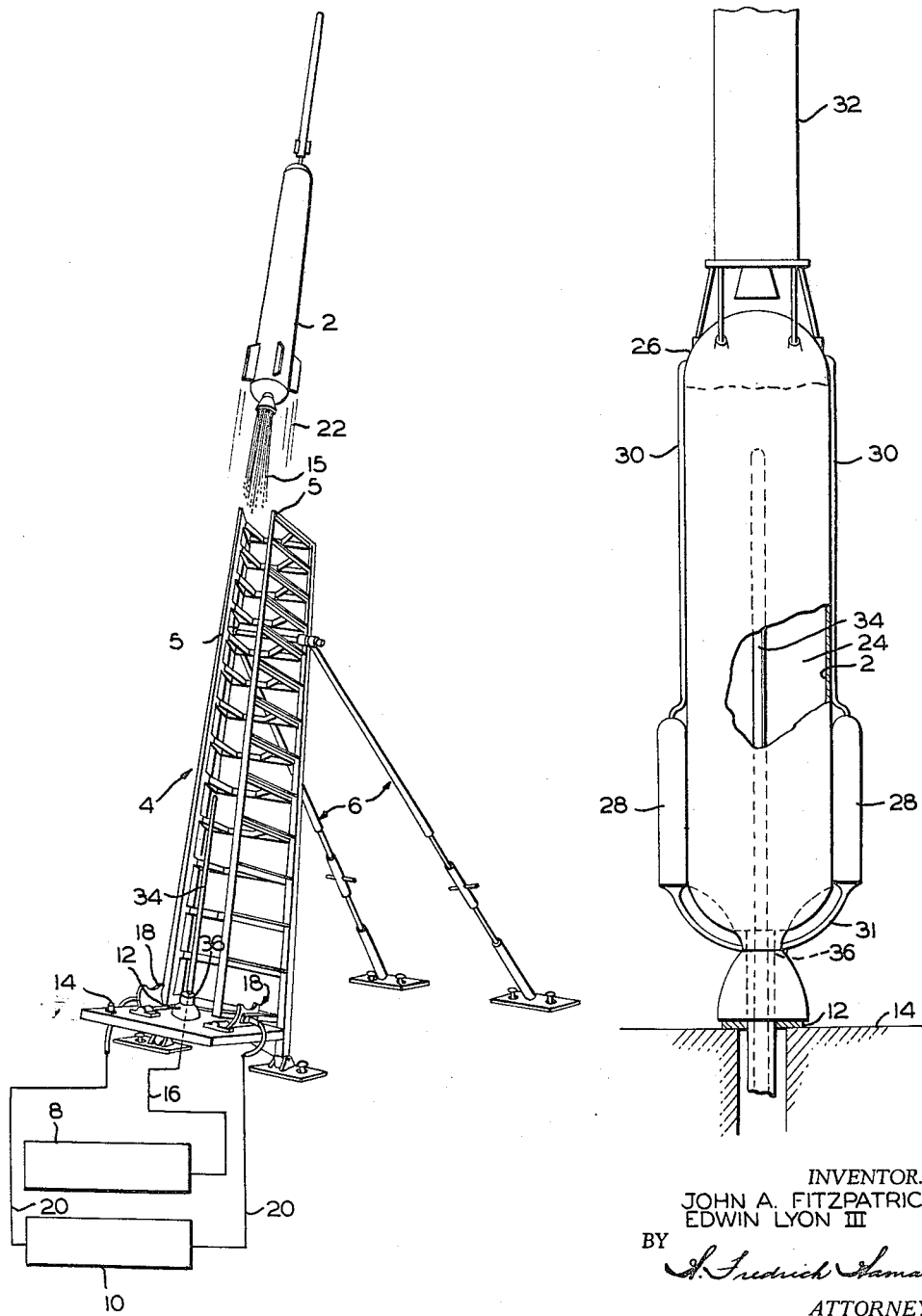

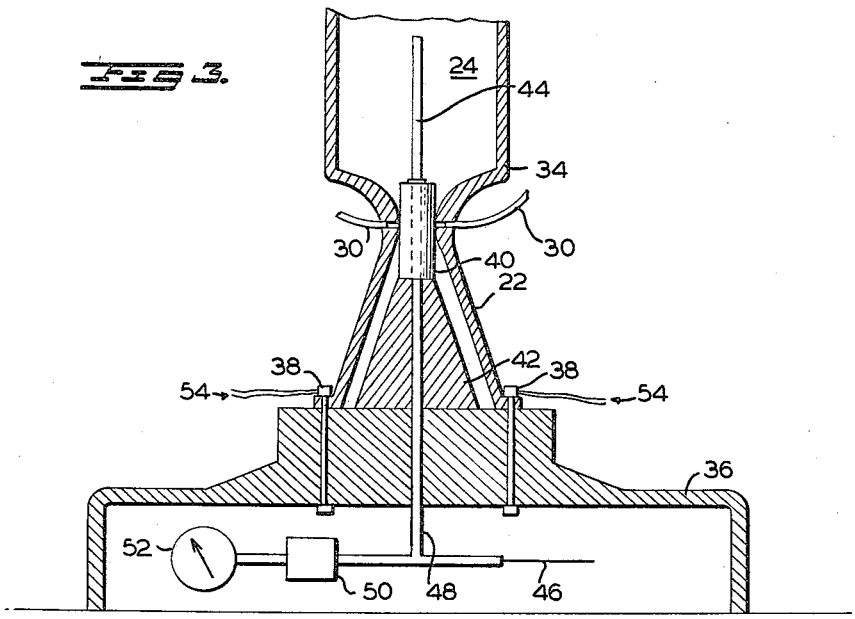
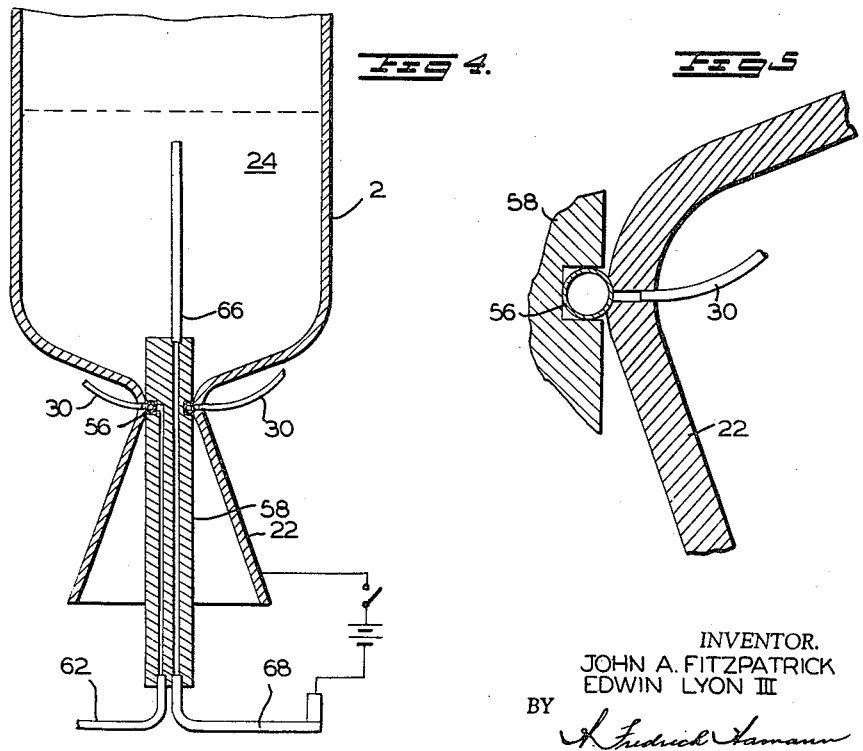

INVENTOR.
JOHN A. FITZPATRICK
EDWIN LYON III
BY
ATTORNEY

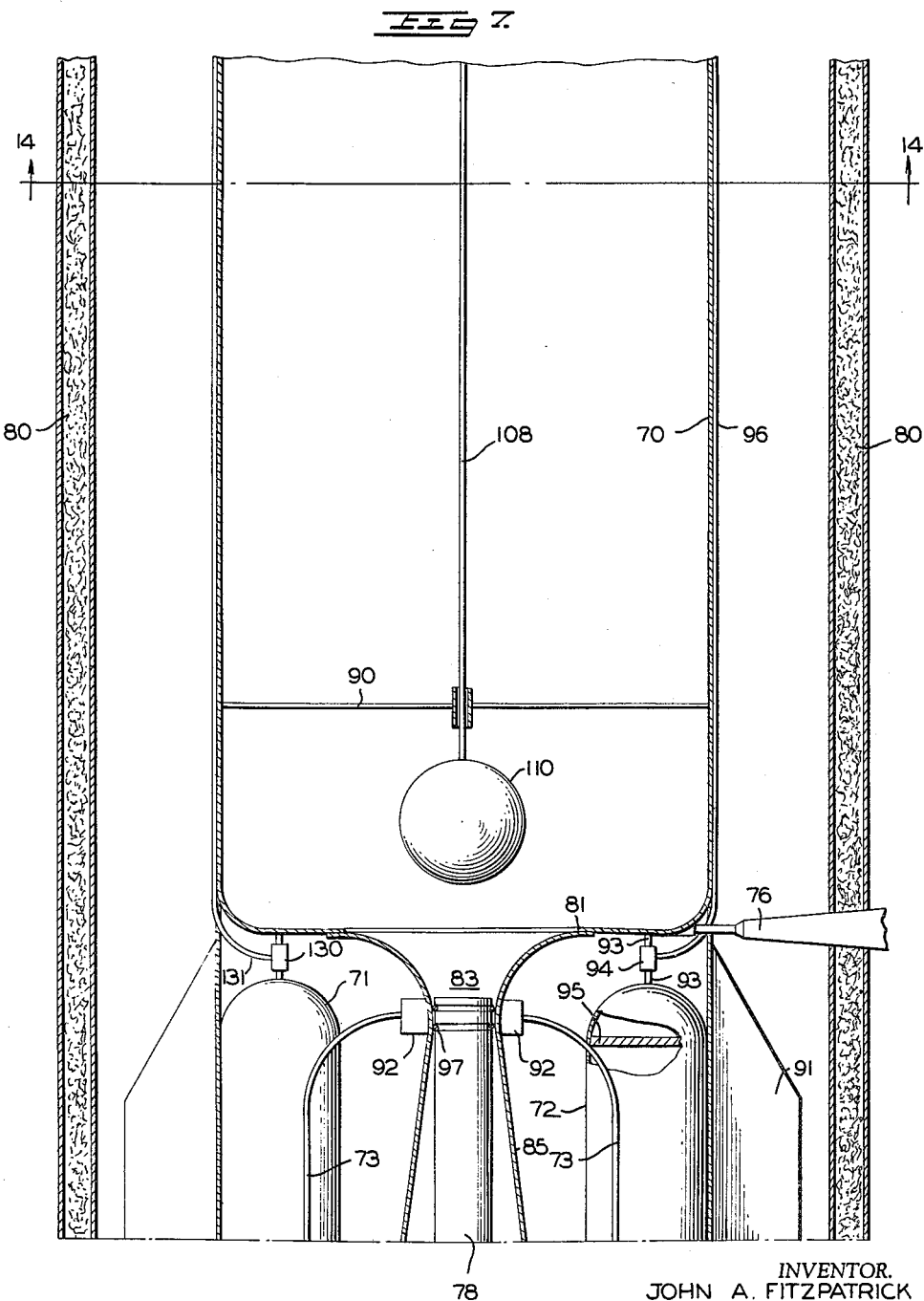

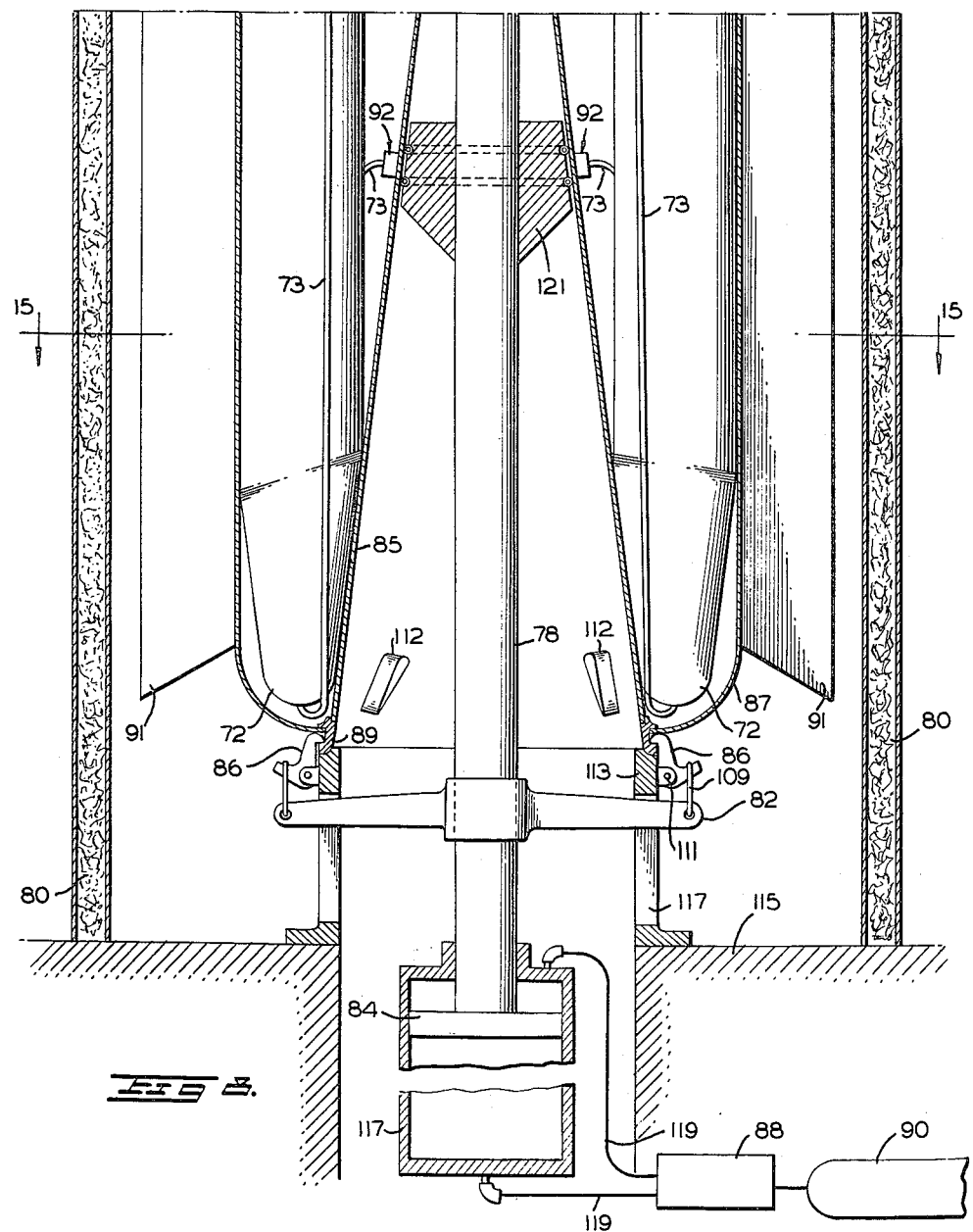

March 26, 1963 J. A. FITZPATRICK ETAL 3,082,666
METHOD AND APPARATUS FOR PROPULSION
Filed Feb. 6, 1959 11 Sheets-Sheet 6
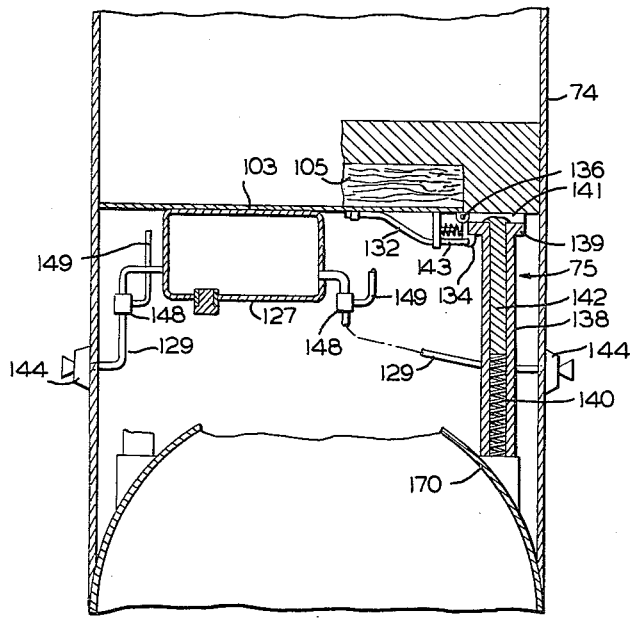
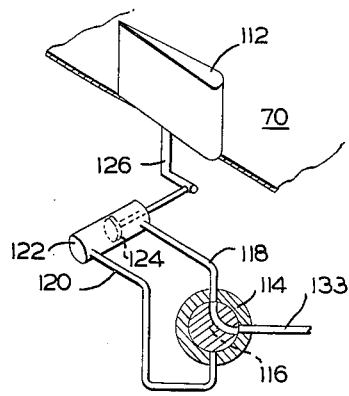
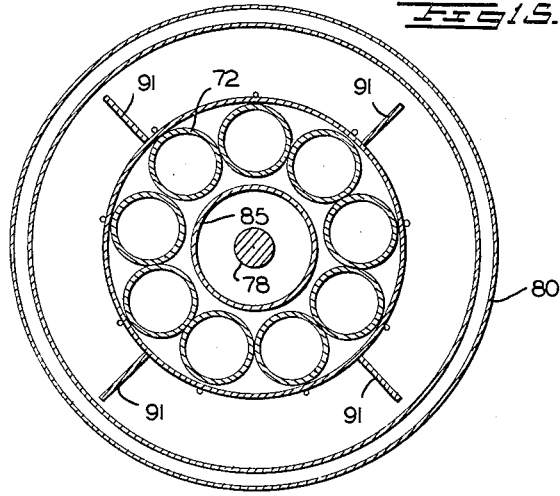
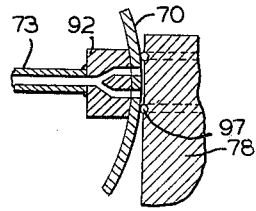
INVENTOR.
JOHN A. FITZPATRICK
EDWIN LYON III
BY
*ATTORNEY*

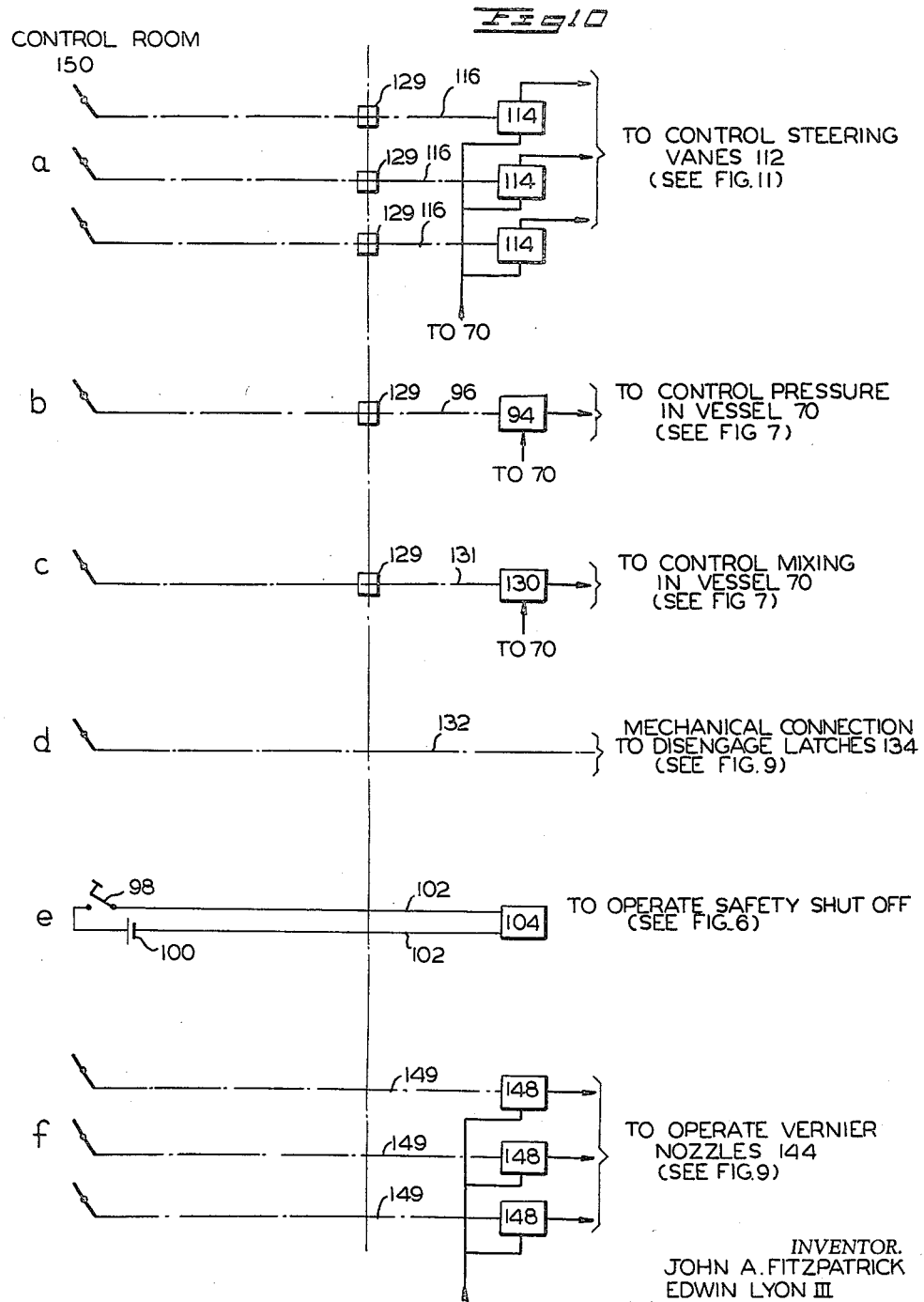

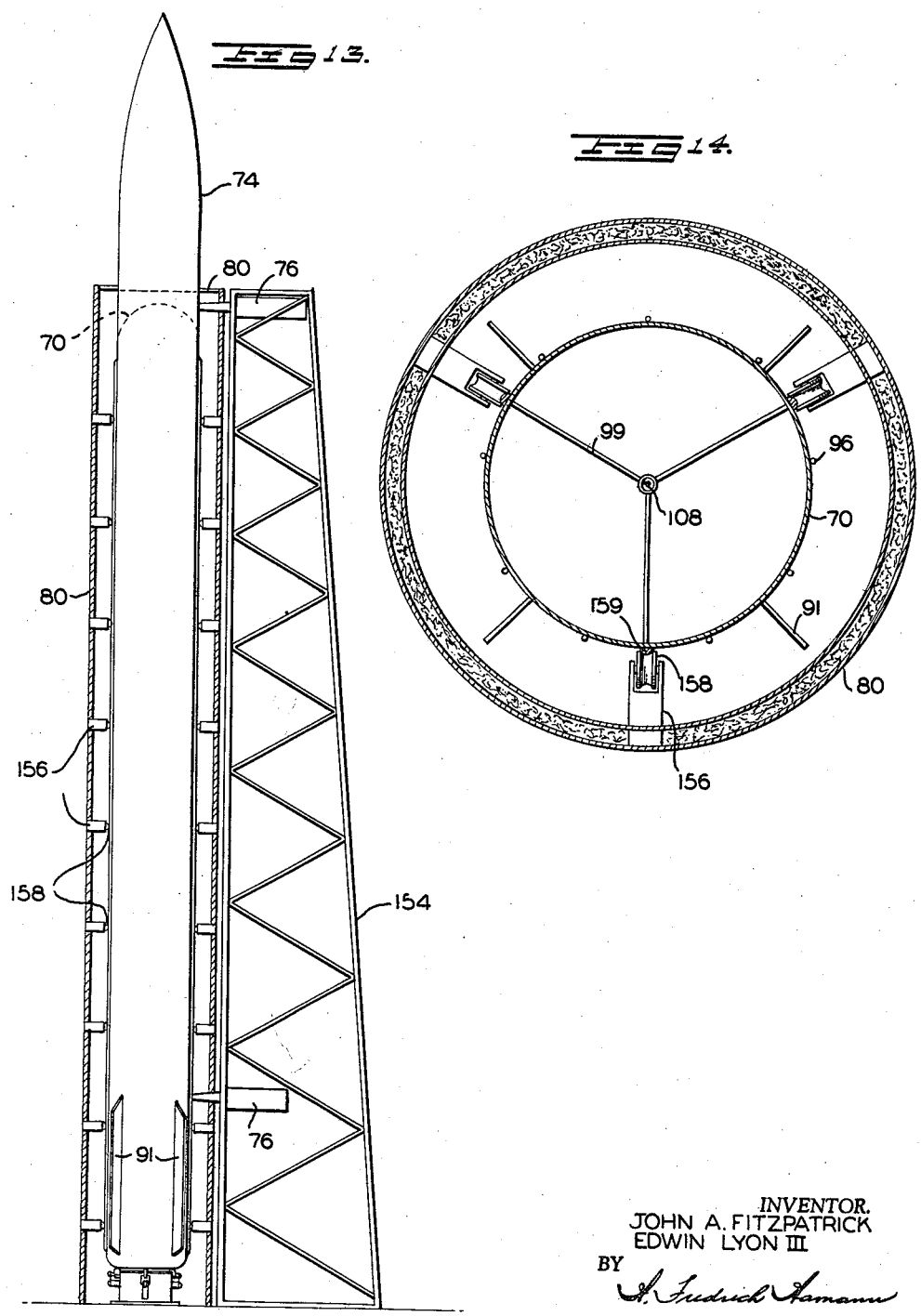

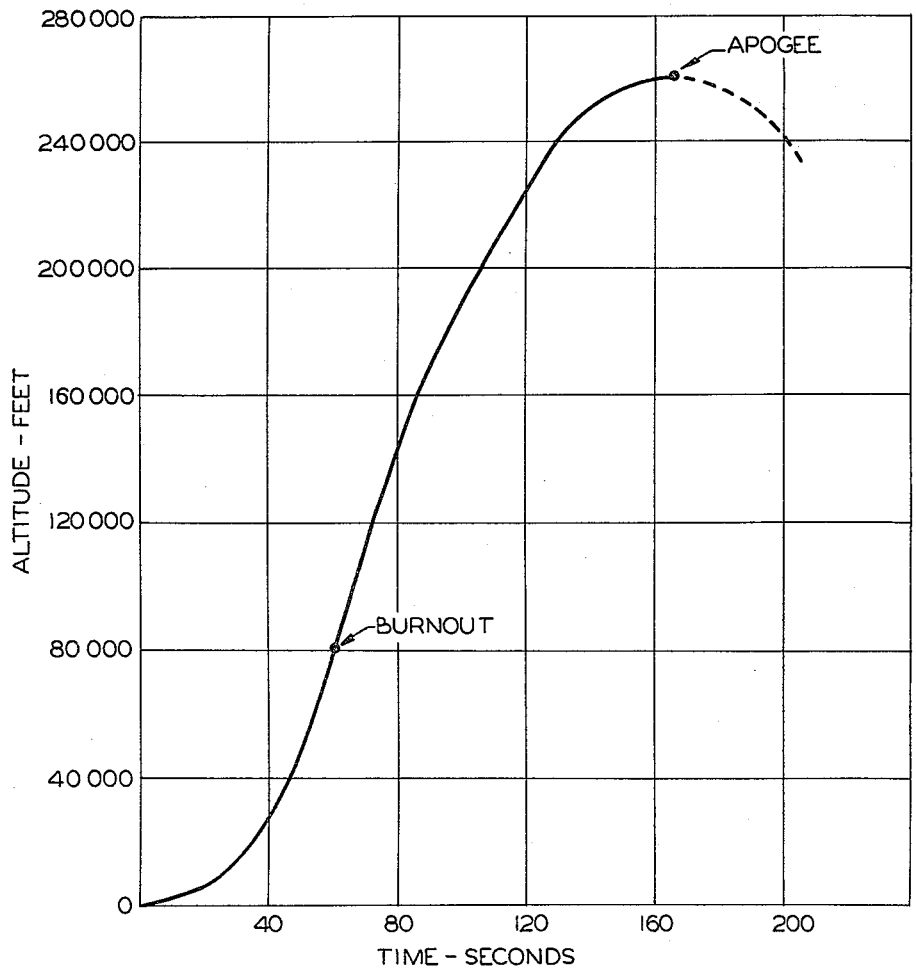

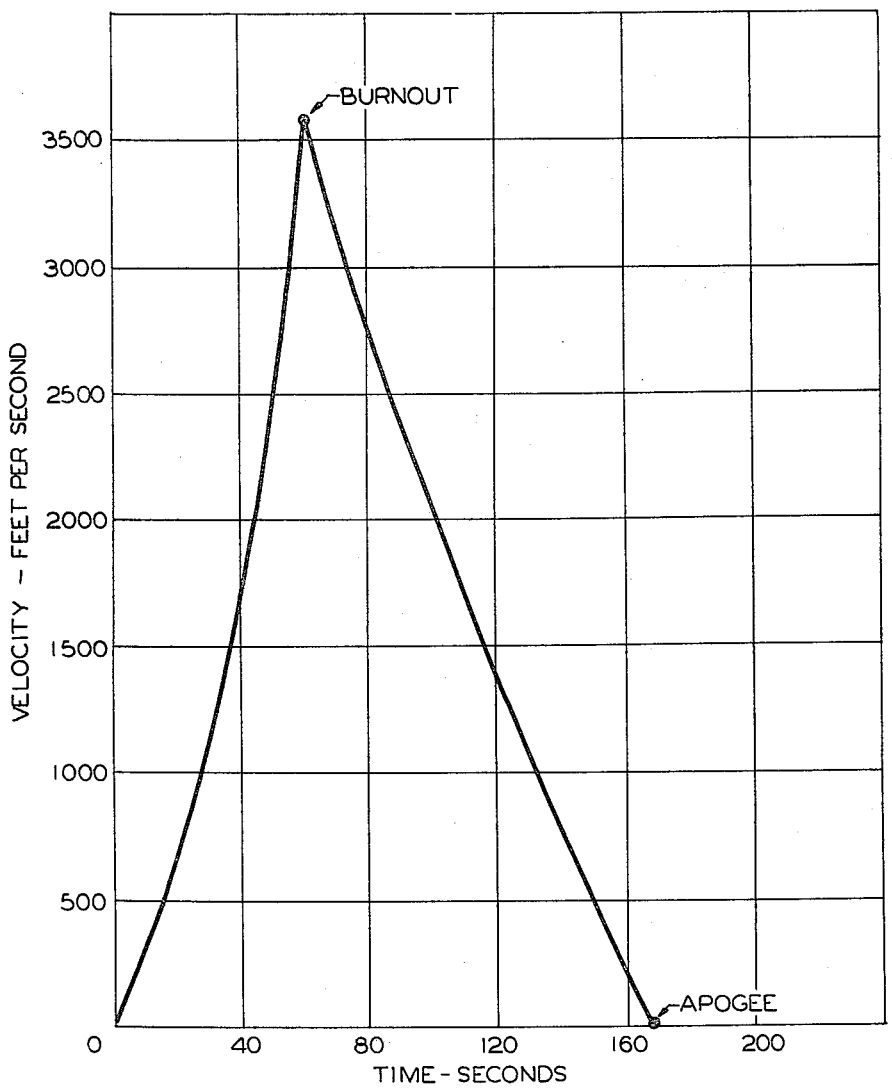

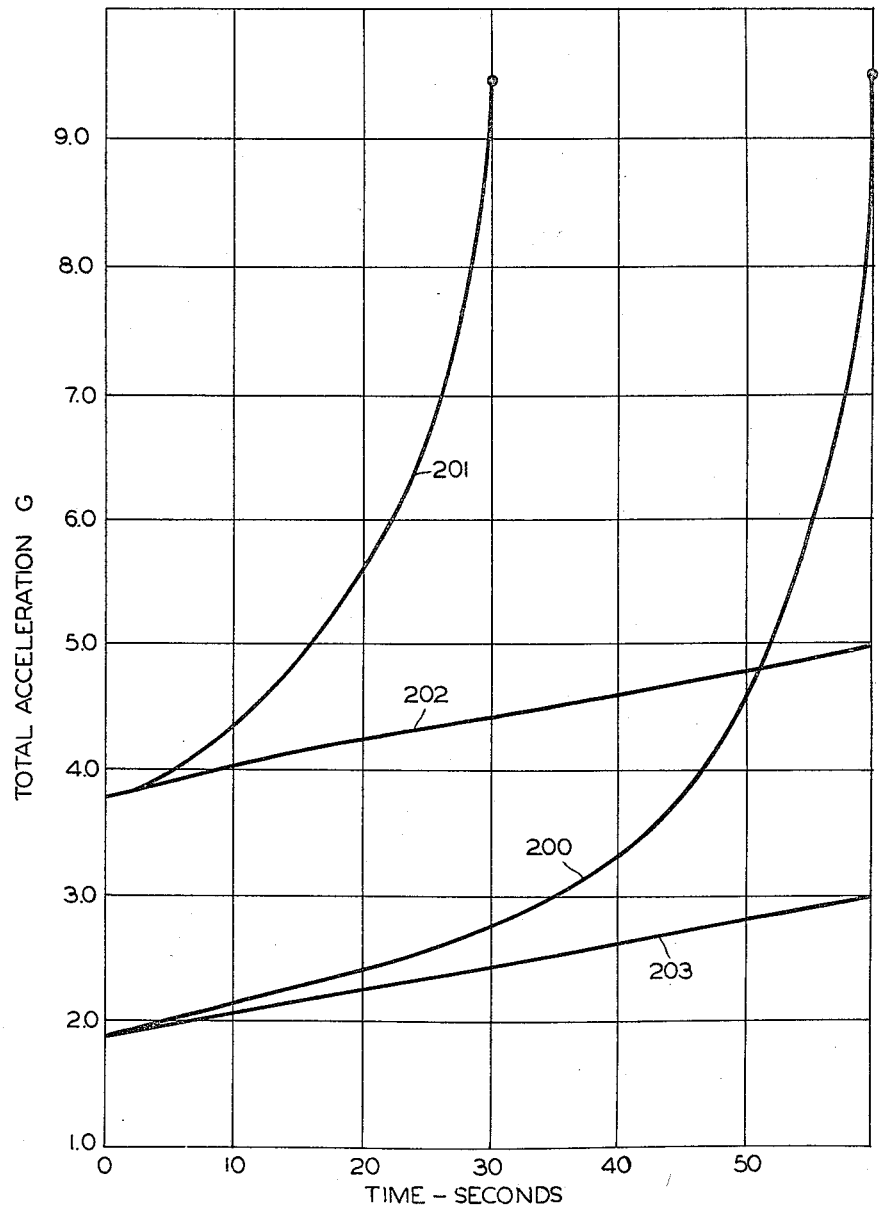

United States Patent Office 3,082,666
Patented Mar. 26, 1963

3,082,666
METHOD AND APPARATUS FOR PROPULSION
John A. Fitzpatrick, Washington, D.C., and Edwin Lyon III, Lanham, Md., assignors to ACF Industries, Incorporated, New York, N.Y., a corporation of New Jersey
Filed Feb. 6, 1959, Ser. No. 791,758
7 Claims. (Cl. 89—17)

The present invention is directed to propulsion devices and more particularly to propulsion devices utilizing steam-pressurized water.

In the rocket propulsion field it is increasingly apparent that an inexpensive, reliable, simple and practical propulsion device is needed for lifting the rocket out of the dense layer of the atmosphere before the high performance propulsion methods and systems are employed. This is apparent when it is considered that a propulsion system and device designed for the high velocity operation in the upper atmosphere or beyond is relatively inefficient when operating at sea level. Further, if the propulsion system is designed to be efficient at sea level, it is relatively inefficient at higher altitudes.

Another problem of increasing importance in the astronautics field is the training of personnel for space flight, particularly the training and the gaining of experience of human reactions when a person is subjected to high accelerations and re-entry into the earth's atmosphere.

The present invention is directed to providing a device which supplies the solution to both of these problems.

The present invention provides a booster system specifically designed to impart an initial velocity and ease a rocket, primarily designed for high acceleration performance, through the high drag region of the lower atmosphere, and to provide a training rocket to carry a person into the upper regions of the earth's atmosphere. Both these embodiments of the present invention are inexpensive to construct, reliable in operation (since thrust failure at the critical stage of flight is virtually impossible), relatively safe in initiation, avoid many of the hazards associated with high energy propellant storage, and utilize low cost fuels.

Therefore, it is the primary object of the present invention to provide a means and method of propulsion utilizing water as the basic fuel.

It is a still further object of the present invention to provide a means and method of utilizing steam pressurized water and a water reacting substance which are mixed to provide a predetermined specific impulse.

It is another object of the present invention to provide a means and method of propulsion adapted to be used as a booster stage on a high performance rocket.

It is a still another object of the present invention to provide a means and method of propulsion for the training of persons for a manned space probe, which is inexpensive, reliable and simple to operate and construct.

It is a still further object of the present invention to provide a means and method of propulsion utilizing steam pressurized water and water-reacting substances which provides a gaseous propellant.

It is another object of the present invention to provide a means and method of propulsion for a manned rocket which may be controlled independent of any grounded system, such controls including direction, attitude, and impulse.

The invention embodies other novel features, details of construction and arrangement of parts which are hereinafter set forth in the specification and claims and illustrated in the accompanying drawings which are hereby made a part of the specification, wherein:

FIG. 1 is a perspective view of a booster embodiment of the present invention.

FIG. 2 is a detail view of the booster portion of FIG. 1.

FIG. 3 is a sectional view of a nozzle sealing means.

FIG. 4 shows a second embodiment of a nozzle seal means and electrical heating system.

FIG. 5 is a detail section of the nozzle seal means of FIG. 4.

FIG. 7 is a partially sectioned view of the training rocket showing the center section.

FIG. 8 is a partially sectioned view of the training rocket showing the lower section and hold down mechanism.

FIG. 9 is a detail sectional view of the ejector and attitude control mechanism.

FIG. 10 is a schematic diagram of the control mechanisms utilized in rocket of the present invention.

FIG. 11 is a detail operational view of the direction control means.

FIG. 12 is a detail sectional view of the fuel and substance mixing means.

FIG. 13 is a partially sectional view of the training rocket launcher.

FIG. 14 is a sectional view along lines 14—14 of FIG. 7.

FIG. 15 is a sectional view along lines 15—15 of FIG. 8.

FIG. 16 is a graph of altitude v. time for a manned space training rocket.

FIG. 17 is a graph of velocity v. time for a manned space training rocket.

FIG. 18 is a graph of total acceleration v. time for a manned space training rocket.

Figure 6:
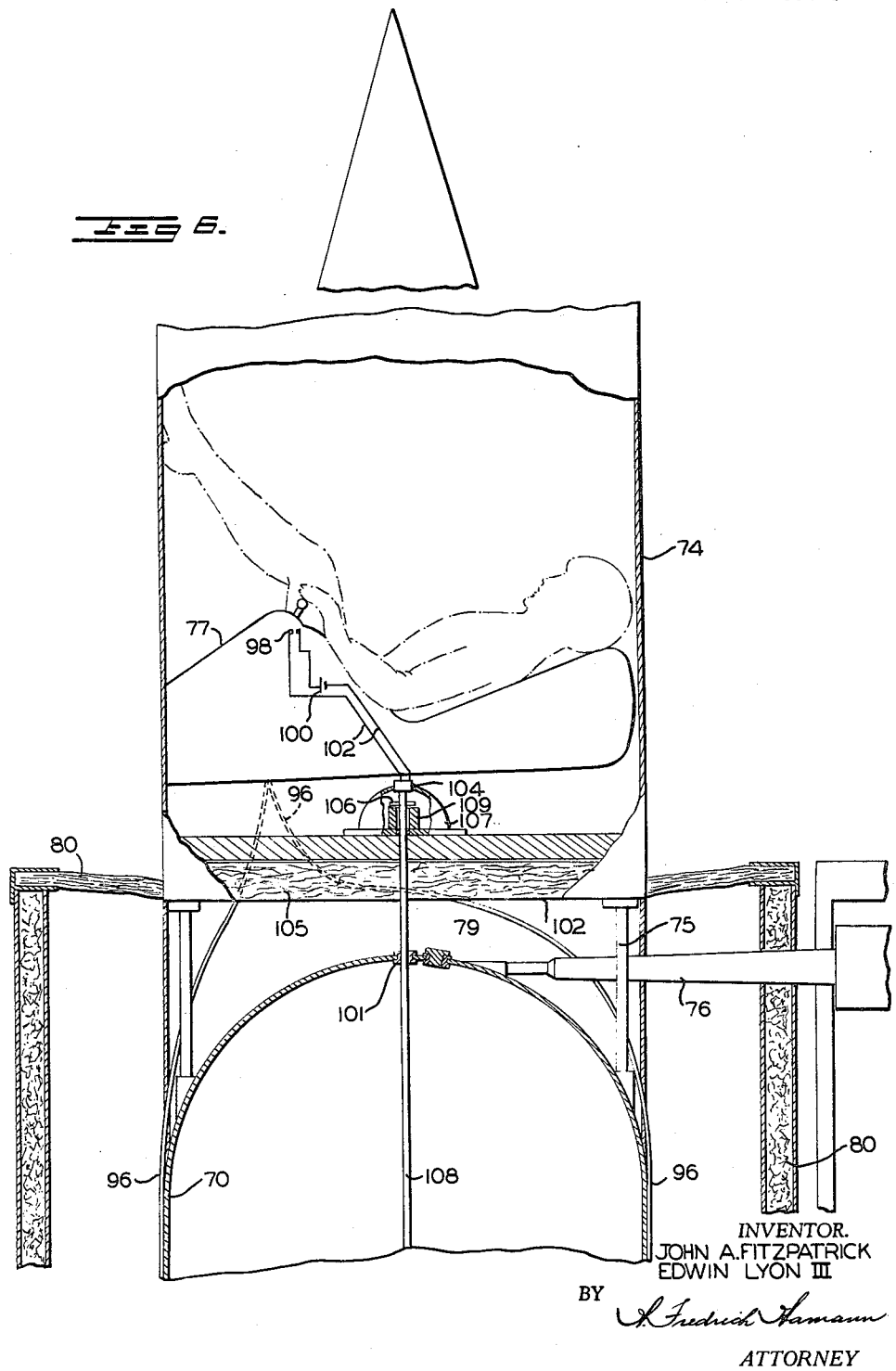
FIG. 6 is a partially sectioned view of the training rocket showing the upper section.

Referring now in detail to the drawings, FIG. 1 shows one embodiment of a launching arrangement wherein the booster 2 is seen to be airborne. The ground installation includes a stand 4 having guide rails 5, variable length supporting members 6, an electrical heating source 8 and a pneumatic source 10 for rocket release. The retaining plug 12 is mounted upon the base plate 14 of the stand 4. The propellant 15 is a mixture of steam and a water-reacting substance as explained hereinafter.

Retaining feet 18 secure the tank 2 upon the plate 14 prior to launching due to the pneumatic pressure in lines 20 from source 10. At rest upon the plate 14, the nozzle flange 22 is held against the plate by the feet 18. In this position the plug 12 acts to seal the nozzle aperture so as to prevent the premature escape of the fuels. When the propellant temperature is sufficient and it is desired to launch the booster it is necessary only to remove the pneumatic pressure to allow springs to move feet 18 or apply a negative pressure so that the feet 18 will retreat from their position against the nozzle flange and thereby allow the fuel pressure in tank 2 to react against the plug 12 and to force itself away from the launching stand. It should be understood that other heating methods, such as the oil burner type and other retaining forces, such as hydraulic pressure could be utilized without departing from the spirit of the invention.

FIG. 2 shows how the thrust resulting from the heated fuel 24 within tank 26 is augmented by the addition, at the nozzle opening, of a water-reacting substance such as sodium. The substance is contained in the side tanks 28 in this embodiment and is forced into the nozzle opening under the pressure of the fuel, steam pressurized water, conveyed by piping 30 from the top of tank 26. Likewise one may employ a saturated hydrocarbon over the sodium as the propellant for ejecting the sodium. The tank 26 acts as a booster in this embodiment for the second stage or payload 32 which is automatically disconnected from tank 26 upon the exhaustion of the booster power. The heating element 34 by which the temperature of the propellant and the pressure within the vessel 26 are increased to operational values is attached to retaining plug 12. A sealing plug 36 to which is attached the heating element prevents the loss of propellant during the initial heating stages. When sufficient temperature and pressure have been built up within the tank due to heating the fuel to the desired operation pressure, i.e., e.g., 800 p.s.i., the retaining feet are removed. The plug 36 may be moved relative to the retaining plug 12 and base 14 thereby allowing the fuel under pressure to be expelled through the nozzle at a high velocity, thereby generating thrust. It is this thrust which is augmented by the introduction of the water-reacting substance from tanks 28 through lines 31, the violent reaction of the substance with the water creating additional heat and thrust, as is explained in more detail hereinafter.

FIG. 3 illustrates one embodiment of the invention which is directed to an apparatus for heating the steam pressurized water as well as a system for controlling the release of the vessel. The vessel 34 of FIG. 3 is mounted on base 36 by means of explosive bolts 38. An elastic plug 40 is affixed to support 42 and has a pressure sensitive heating electrode 44 passing through it into the vessel proper to facilitate heating of the fuel, and measuring the pressure within the vessel. Electrical conductor 46 is provided as one of the leads for the heating current which flows between the vessel shell and the electrode 44. Elastic plug 40 is force fitted into the nozzle to prevent loss of fuel or intermixing of the fuel 24 and the water-reacting substances in pipes 30 prior to launching.

A suitable pressure transducer 50 responsive in the pressure sensitive electrode 44 and associated with pressure gauge 52 may be connected to piping 48 so that operators may note the pressure within the vessel 34. When sufficient pressure has been built up within vessel 34, launching may be accomplished by activating the conductors 54 so as to destroy the explosive bolts 38. This allows the pressure within the vessel 34 to react against the expansible plug 40 and to thereby push the vessel away from the plug and into flight.

The embodiment of FIGS. 4 and 5 shows one desirable method of heating and plug retention. An expansible O-ring 56 is utilized to retain plug 58 within the nozzle of vessel 2 during the period of increasing pressure prior to launching. The plug 58 is securely seated in the detent formed in the nozzle of vessel 60 by pneumatic or hydraulic pressure through pressure line 62. The application of pressure through line 62 expands O-ring 56 into the nozzle detent to prohibit loss of fuel 24 as its temperature and the vessel pressure is increased. One method of heating the propellant is to pass an electric current from the shell of the vessel 2 to the electrode 66 within the vessel. Conduction from the electrode 66 to the external power source is by way of insulated electrode conductor 68. When the temperature of the fuel has risen to the point where the pressure within the vessel is that desired for launching, firing of the rocket may be accomplished merely by decreasing the O-ring pressure so as to collapse the O-ring sufficiently to become disengaged from the nozzle detent. More positive action may be had in this respect by removing the expansive pressure and applying a negative pressure or vacuum to line 62. This will insure the removal of the O-ring from the detent and thereby decrease the drag which the vessel thrust must overcome.

The preferred embodiment of the present invention is illustrated in FIGS. 6–8 and includes a main vessel 70 containing steam pressurized water at a temperature between at least about 475° F. and about 550° F. at a pressure of from at least about 500 p.s.i.a. to about 1000 p.s.i.a. with about 800 p.s.i.a. being optimum. The vessel 70 is preferably circular in cross-section and has a man-carrying capsule 74 releasably supported on its upper end by connector means 75. The capsule 74 contains a seat 77 for suporting a man and various controls as explained in more details hereinafter.

To augment the thrust created by the passage of a steam pressurized water through a restricted vent or nozzle, a reactant is introduced into the stream of fuel flow. The resulting chemical reaction of the reactant with the fuel provides additional thrust for the capsule carrying vessel. Suitable piping is provided within the propulsion device to utilize the same pressure which acts against the fuel to force the reactant substance into the stream of flow. A plug mechanism is provided to seal the reactant duct ports prior to launching and a pressure activated mechanism is utilized for rapidly removing the plug mechanism at the time of launch. Fuel heating is accomplished by connecting an electric power source to the ends of the fuel vessel and utilizing the conductive property of the vessel itself as the heater element or by chemical reaction as described hereinafter.

The vessel 70 has a filling plug 79 at its upper end through which the water is initially put into the vessel 70. The lower extremity of the vessel 70 has an opening 81, centrally located with respect to its longitudinal axis, leading through a duct 83 to a nozzle 85. The nozzle 85 extends the full length of secondary container 87, and has a flange member 89 at the point where nozzle 85 and secondary container 87 are integrally attached. The container 85 has a plurality of stabilizing fins 91 located on and spaced around its outer surface.

The volume between the nozzle 85 and container 87 is utilized to support one or more secondary vessels or tanks 72. The tanks 72 contain one or more water-reacting substances used in the propulsion system as is explained in more detail hereinafter. The upper ends of tanks 72 have a duct 93 connecting the volume of tanks 72 and vessel 70 through a valve 94 or the tanks may be pressurized by means of heat conducted through the rocket tankage structure and the tank wall, thereby vaporizing a non-reacting fluid entrapped above the reactant, e.g., sodium in the tank. The valve 94 is selectively movable through control conduits 96 which provide for control in the capsule 74.

The vessel 70 containing fuel has heat induction plugs 76 at the upper and lower extremities of the propulsion device. Electrical current flowing from one plug to the other, by way of the vessel shell 70 causes the vessel to act as a heater to thereby increase the temperature of the fuel. Since the vessel nozzle is closed by the plug 78, pressure will build up within the vessel as the temperature rises. Insulation 80 surrounding the tank 70 will tend to confine the heat to the enclosed area. The nozzle plug 78 with its associated latch mechanism, cooperating with flange member 80 including a yoke release bar 82, acts to seal the fuel within its tank 70, to retain the reactants within their respective tanks 72 prior to launching and hold down the rocket. The tanks 72 are connected, at the end opposite to the connection through duct 93, through ducts 73 to an injector 92 which is sealed from the duct 83 and the interior volume of the nozzle 85 by O-ring seals 97 or similar devices.

Supported within the vessel 70 on spiders 99 and slidable with respect to spiders 99 is a rod 108 having a spherical plug 110 at its lower extremity. The rod 108 passes through and is movable with respect to a packing gland 101, and extends upwardly through a separating wall 103 and insulation 105 into a control box 107. The rod may be manually movable, but in the preferred embodiment a shear pin 106 on a seat 109 are provided so that an explosive cap 104, when activated by switch 98 connects battery 100 through leads 102 to fire the cap 104 and shear the pin 106. The rod 108 and spherical plug 110 will drop into the duct 83 thereby preventing further propulsion. This device is a safety device and is only utilized when other controls hereinafter described do not function properly.

The plug 78 carrying the O-rings 97 at its upper end has attached to it a yoke 82 having connectors 109 which attach to retaining claws 86 pivotally mounted as at 111 on a base support 113. The base support 113 is mounted on a pad 115 and has slots 117 to accommodate the yoke 82 as the plug 78 travels downwardly. Intermediate the ends of nozzle 85 a second injector 92 may be placed and a second O-ring sealing means 121 utilized, as will be apparent hereinafter. Pressure lines 119 are connected to opposite sides of the piston 84 and to a hydraulic pump 88 and reservoir 90. The rocket up to the capsule 74 is contained in an insulating structure 80.

Steering vanes 112, preferably three in number, are located along the interior of the nozzle 85. Control apparatus for altering the direction of flight of the propulsion device is provided by the steering vanes 112. A detail view of one such steering system is shown in FIG. 11. With such apparatus the direction of flight may be altered either automatically, by gyro control or manually by shaft or flexible cable control. As shown in FIG. 11 the vane 112 is activated by steam pressure through duct 133 from the tank 70 which is channeled through the valve 114 in accordance with the positioning of the rotatable shaft 116. Movement of the shaft 116, automatically or manually, either closes the valve 114 or allows steam pressure to flow either through line 118 or 120 to the cylinder 122 to drive the piston 124 which in turn deflects the shaft 126 to which the vane 112 is attached. The movement of one or more vanes in the stream of flow deflects the thrust to a line other than parallel with the center line of the nozzle so as to alter the direction of flight of the propulsion device. The shaft 116 is controlled on the control panel as is apparent from FIG. 10.

Referring now to FIG. 9 a detail sectional view of a portion of the capsule and injector mechanism is shown. Specifically the connectors 75 consist of an outer tubular portion 138 welded or otherwise integrally attached to the vessel 70 and having an upper flange 139. A base plate 141 integrally attached to the capsule 74 has a rod extension 142 extending downwardly into the tube 138 and compressing a spring 140. A latch 134 pivoted about 136 is connected to the base plate 141 and has an extended portion which holds the flange 139 against the base plate 141. A spring 143 normally urges the latch 134 into engaging position with the flange 139. A cable 132 is attached to the latch 134 so that movement of cable 132 disengages the latch and allows the spring 140 to force the rod 142 out of the tube 138 thereby ejecting the capsule 74 from the remainder of the rocket containing tanks 70 and 72 and the nozzle 85. A plurality of connectors 75 may be utilized. The cable 132 is connected through a quick disconnect plug to the control panel in capsule 74.

A pressurized fluid containing tank 127 is also provided and is integrally attached to the separate wall 103 of capsule 74. This fluid passes through ducts 129 under the control of valves 148 to vernier nozzles 144 located on the outer surface of capsule 74. The vernier nozzles may be utilized to maintain or correct the attitude of the capsule after ejection from the propelling portion of the rocket. The valves 148 are connected through lines 149 to the control panel.

FIG. 10 shows the schematic arrangement of the controls. Of the six types of controls shown only (d) and possibly (e) are essential to the simplest embodiment of the present invention. The other control systems are optional but may be included if the advantages of steering control, mixing control, and the control of the pressure in vessels 72 are required. The controls 150 shown located in the control room may consist of levers or rotatable members to which are attached cables or rotatable flexible cables connected to their respective valves 114, 94, 130 through quick disconnect couplings 129. The valve 130 controlled through line 131, may control the flow of steam pressure from the main vessel 70 to one (71) of the vessels 72 which is not connected at its other end to the injector 92. This vessel 71 may contain the substance as described hereinafter, which is mixed with the contents of vessel 70 to raise its pressure and temperature.

The control circuits (d), (c) and (f) are preferably wholly contained in the capsule 74 and therefore no disconnect plugs are required. The circuit (d) consists of a lever 150 having a cable 132 connected to latch 134 (see FIG. 9). The control circuit (c) has been described above. The control circuit (f) consists of levers 150 and movable cables 149 for selectively opening and closing valves 148 which control the flow of fluid from the tank 127 to the verniers nozzles 144.

OPERATION

When sufficient temperature and pressure exist within the fuel tank for launching the heat induction plugs 76 are withdrawn. Blastoff may then be accomplished by the application of hydraulic pressure to the piston 84. Downward motion of the piston 84 moves the yoke release bar so as to disengage the retaining claws or latches 86. Simultaneously the plug 78 is moving down and out of the nozzle so as to allow the pressurized fuel to exhaust through the nozzle and to react with the one or more reactant materials which are ejected from the reactant injectors 92. One form of these injectors is shown in FIG. 12.

Once having become diassociated with the ground apparatus the occupant of the capsule 74 may activate any one of several control mechanisms. One control the operator has is apparatus for thrust regulation. This is accomplished by the water pressure control valves 94 which regulate the amount of reactant which is released into the fuel stream by regulation of the amount of pressure from the fuel tank which is applied to the reactant. Control of this pressure is realized by means of flexible cables within control conduits 96 which interconnect the control valves 94 with the operators capsule 74. By movement of the flexible cables the pressure exerted on the reactant, from fuel tank 70 to reactant tank 72 may be varied.

The reactant tank may be a single annular tank or several tanks mounted in the configuration of an annulus as shown in cross-section in FIG. 15. If more than one tank is used, more than one reactant may be utilized and more than one injection location within the nozzle may be made use of. For example, the first reactant could be injected from one or more tanks through the injectors 92 of FIG. 7 and a further chemical reaction evolved by an additional reactant injection further down the nozzle by the injectors 92 shown in FIG. 8. By so doing the advantages of utilizing two injection stages and two different reactions may be realized.

The entry of the fuel through valves 94 to the reactant tank 72 may react to add additional pressure to the reactant to thereby initially dispense more reactant than desired. However, it can be seen that such an event results in an automatic regulating system since if the reaction creates a larger pressure at the valve than is in the vessel 70, the flow of water into the vessel 70 will be terminated and the reaction will close. One method of preventing a reaction, if such is desirable, at the valve 94 is shown in FIG. 7 where a floating piston 95, or similar means, is utilized to isolate the fuel in tank 70 from the reactant of tank 72. Reactant piping 73 is provided, as shown in FIGS. 7 and 8, interconnecting the reactant containing tanks 72 with the injectors 92. This piping 73 conveys the pressurized reactant to the injectors where the reactant may react with the discharging fuel.

An emergency control available to the operator operates to seal the duct 83 to thereby discontinue the release of fuel. One such control is shown in FIG. 6 and includes the use of explosive cap 104. The resulting explosion severs the shear pin 106 to allow the rod 108 with its attached spherical venturi plug 110 to drop into the nozzle duct to prevent the further escape of fuel.

Other controls for the reaction propulsion device are shown detailed in FIG. 9. At any time after launching, but preferably at the moment the device reaches its maximum altitude, the operator may jettison the main tank from the capsule. Means are provided for directional flight control of the capsule after it has been disconnected from the larger propulsion unit.

Since the capsule is physically located atop the propulsion apparatus, the force of gravity and acceleration forces tend to maintain the capsule in its initial position. Due to this fact a complicated ejection system is not needed. To separate the capsule from the main propulsion unit it is necessary for the operator to merely actuate the cable 132 of FIG. 9. By so doing the rocker arm 134 rotates about its pin 136 so as to become disassociated from the shoulder of tube 138 and compressed spring 140 is allowed to exert pressure upon the rod 142. The resulting action is for the spring 140 to push the capsule and propulsion unit away from each other.

The operator, shown in outline in FIG. 6, is supported throughout the flight by a seat or other supporting means 77. Fingertip controls are utilized generally, due to the acceleration forces acting on the operators body.

FIG. 13 shows one embodiment of the ground supporting apparatus for reaction propulsion device. As there shown the tank 70 with associated capsule 74 is supported within framework 154. Guide supports 156 with their guide rollers 158 assure vertical motion for the device during its first moments of travel. FIG. 14 shows more clearly the interaction of rollers 158 and guide rails 159 to maintain the preselected angle with the horizontal to be used in firing the rocket. The angle is preferably 90° for the preferred embodiment.

The following description and calculations are given as an example of the characteristics and performance of a manned training rocket but are not to be interpreted as limiting the scope of the present invention.

The example is directed to a training rocket carrying a 2000 pound payload to an altitude in excess of 25,000 feet. Simplicity is achieved in this example by employing steam pressurized water reacting with sodium as the propellant. Water above its saturation temperature in a pressure tank flashes into steam in the expanding part of the nozzle where approximately 15% by weight of sodium is injected to increase the specific impulse of the propellant to a value of 150 seconds. This rocket is free of such complicating devices as pumps, fuel handling equipment and the high probability of thrust failure during the critical launch period. This embodiment is described as the simplest form of the present invention. Thus, a first vessel containing the steam pressurized water and a second vessel containing the sodium are provided. The complicating features of variable valve controls between the first and second vessels, attitude, directional, and additional reacting substance, etc., are eliminated so that the extreme simplicity of the present invention will be readily apparent.

VEHICLE CHARACTERISTICS

Payload _____ 2000 lbs.
Minimum apogee_____ 200,000 ft.
Maximum acceleration_____ 10 G.
Propellant specific impulse__ 150 seconds.
Maximum tank pressure____ 1000 p.s.i.
Tank and nozzle weight____ 4000 lbs.
Tank wall thickness_____ 5/32 inch.
Tank wall weight_____ 3600 lbs.
Nozzle and end caps weight_ 400 lbs.
Maximum stress in steel____ 150,000 p.s.i.
Tank volume_____ 550 ft.$^3$
Tank dimensions_____ 48″ diameter x 45 ft. length.
Weight of water in tank_____ 23,000 lbs.
Weight of sodium in tank____ 2500 lbs.
Final empty weight_____ 6000 lbs.
Initial total weight_____ 31,500 lbs.
Maximum thrust_____ 60,000 lbs.
Water discharge rate_____ 400 lbs./sec.
Maximum discharge time___ 64 seconds.
Throat diameter_____ ∼ 5 inches.

The following is a sample computation for the first ten second interval taking into account air drag and starting velocities. These results are conservative since the acceleration value used in the computation of the incremental velocities is that at the beginning of interval. These computations are provided so that other combinations of payload, apogee, impulse, volume, thrust, steam pressure and temperature, water-reacting substances, etc., can be readily made by those skilled in the art.

In a vacuum the final velocity is:

$$V = 32 \times 150 \frac{31,500}{6,000} = 6,030 \text{ ft./sec.}$$

whereas the final velocity is 3580 ft./sec. when atmospheric drag is considered, the drag coefficient being assumed as 0.5.

Initial 10 sec.
Acceleration=+one g.
($V_1$), $T=10$ sec.=320 ft./sec.
$H_{10} = \frac{1}{2} gt^2 = 16 \times 100 = 1600$ ft.
Drag=$\frac{1}{2} \times .002378 \times 0.5 \times 12.6 \times (320)^2$
  =770 lbs.
Net thrust=60,000−770=59,230 lbs.
$W$ ($T=10$) 31,500−4000=27,500 lbs.

Total acceleration=$\frac{59,230}{27,500} = 2.15\ g$

Similar calculations are made for various 10 sec. intervals and are given in Table I. The results of these calculations as shown in Table I are plotted in FIGS. 16–18. FIG. 16 is a plot of the altitude in feet as a function of time. It is apparent that at about 64 seconds with an altitude of about 80,000 feet the burnout point has been reached and the rocket coasts attaining a final apogee of slightly greater than 250,000 feet. That part of the rocket containing the person is detached from the portion containing the various propellant vessels and nozzle and is supplied with the usual reentry apparatus, e.g., parachutes, etc.

*Table I*

POWER CONDITIONS

| Time (sec.) | Velocity (ft./sec.) | Altitude (ft.) | Drag Force (lbs.) | Thrust Force (lbs.) | Weight (lbs.) | Acceleration ($g$) |
|---|---|---|---|---|---|---|
| 0 | 0 | 0 | 0 | 60,000 | 31,500 | 1.9 |
| 10 | 320 | 1,600 | 770 | 59,230 | 27,500 | 2.15 |
| 20 | 690 | 6,600 | 2,900 | 57,100 | 23,500 | 2.43 |
| 30 | 1,130 | 15,650 | 6,000 | 54,000 | 19,500 | 2.77 |
| 40 | 1,698 | 29,750 | 8,150 | 51,850 | 15,500 | 3.35 |
| 50 | 2,448 | 50,480 | 7,000 | 53,000 | 11,500 | 4.6 |
| 60 | 3,588 | 80,660 | 3,200 | 56,800 | 6,000 | 9.5 |

COASTING CONDITIONS

| | | | | | | |
|---|---|---|---|---|---|---|
| 70 | 3,098 | 114,090 | 450 | −450 | 6,000 | 0 |
| 80 | 2,753 | 143,340 | 120 | −120 | 6,000 | 0 |
| 166 | 0 | 261,340 | negligible | 0 | 6,000 | 0 |

FIG. 17 shows the velocity of the rocket as a function of time. The maximum velocity being attained at burnout. The velocity falls off rapidly reaching zero when the apogee is attained.

FIG. 18 shows a plot of the total acceleration as a function of time. Curve 200 shows the acceleration curve where the valves 94 are fully opened initially and remain in that position throughout the flight. Curve 201 shows the effect of doubling the area of the exit nozzle opening. It is apparent from a comparison of curves 200 and 201 that an initial acceleration can be selected merely by selecting the nozzle exit area. In general, it may be stated that, as a reasonable approximation, the diameter of the nozzle opening is linear function of the discharge rate. In the case of curve 201, however, the burnout point will come at about 30 seconds and therefore the apogee altitude will be considerable smaller than in the case of curve 200. Curve 202 is an example of utilizing the larger nozzle exit area of curve 201, but providing for the gradual closing of valves 94 to provide for a more uniform acceleration. Curve 203 shows the effect of the gradual closing of valves 94 on the embodiment described in detail above. In both cases, i.e., curves 202 and 203, the burnout time will be 60 seconds since this is primarily controlled by the velocity of the steam through the nozzle but the altitude attained and the maximum velocity will be reduced over the case shown in FIGS. 16 and 17.

The above described acceleration, velocity, nozzle area, and variable input of reacting substance serves to indicate the extreme versatility coupled with the complete simplicity of the device makes it ideally suited for training purposes as well as booster applications. As has been described above one embodiment of the present invention utilizes two reacting substances, these reacting substances preferably react with both the water and each other. One example of such a system is given. In the embodiment utilizing two groups of reacting substance containing tanks, the preferred method of operation is as follows.

One group of tanks or one tank 71 is filled with HCl and the other tanks 72 contain Na. The main vessel contains steam pressurized water at least about 500° C. at about 800 p.s.i. It should be noted that the present invention contemplates the use of steam pressurized water at temperatures between about 475° F. and about 550° F. and pressures of from about 500 p.s.i.a. to about 1000 p.s.i.a. Pressures and temperatures higher than these require vessel wall thickness and corresponding weight increases so as to make it uneconomical for propulsion purposes for a rocket.

In this embodiment the water containing vessel is originally maintained at a temperature of about 450° F. In order to bring the temperature and pressure of the water up to the desired operating level in the least possible time without utilizing the costly and slow methods of electrical or oil heat, the contents of vessel 71 are injected into the water. The vessel 71 contains halogen acid or sulfuric acid, preferably HCl. When the HCl is injected into the water the chemical reaction which takes place heats the water an additional 50° F. thereby bringing the steam pressurized water to about 500° F. the preferred operating temperature. This 50° F. rise in temperature, however, increases the pressure from about 425 p.s.i. to about 680 p.s.i. The amount of HCl used may be varied dependent upon the rise in temperature and pressure desired. In the example cited about 72 grams of HCl per 1000 grams of water was utilized.

Another possible method of operating the rocket of the present invention is to fill a portion of the vessel 70 with water at ambient temperature and pressure (70° F., 0 p.s.i.). For every 1000 grams of water 37 grams of Li would be injected into the water either from an external source or from one of the tanks 71 or 72. This 37 grams would react with the water to raise its temperature to 520° F., 800 p.s.i. About 94 grams of $H_2O$ would be utilized in the reaction leaving 906 grams $H_2O$ in the form of steam pressurized water to be utilized as the fuel for a second reaction in the nozzle. These figures ignore the additional pressure created by the generation of hydrogen in the reaction which would amount to about the order of 5% of the volume of the 1000 grams of $H_2O$. Thus, the pressure and temperature would in fact be higher. In this manner the rocket could be made operational with a few minutes without requiring any of the above mentioned electrical and mechanical heating systems. Furthermore, the rocket could be located on the launching pad with all of the fuel elements contained in their respective vessels with comparative safety. No high pressure and high temperatures would be present until immediately before the launching. Thus, training in all aspects of communication and launching preparations can be effected in the actual environment with comparative safety. It may be noted that a capsule of water-reacting substance may be contained within the vessel 70 and rupture of this capsule accomplished by an explosive driven rod similar to rod 108. If Li is used to heat and pressurize the water then approximately 10% of the water utilized in the reaction is lost in so far as subsequent reactions are concerned. However, the hydrogen produced is at a high temperature and is an excellent propelling element.

Returning now to the example cited above wherein HCl is utilized, this method has the advantage that the Cl will react with the Na to form salt in the subsequent reaction as described hereinafter. With the steam pressurized water containing 36 grams of HCl per 1000 grams $H_2O$, Na is mixed in the nozzle. 23 grams of Na is provided per 36 grams of HCl. About 10% of the water flowing through the nozzle is utilized in the water-Na reaction to form NaOH. Since 100 grams $H_2O = 5.55$ moles, then $5.55 \times 23 = 128$ grams Na. Therefore, 128 grams Na (for the $H_2O$ reaction) +23 grams Na (for the HCl reaction) requires 151 grams Na per 1000 grams $H_2O$ containing 36 grams HCl. The Na preferentially reacts with the Cl to yield 76 kilo calories/23 grams Na. The water-Na reaction yields 189 kilo calories for a total of 265 kilo calories which is used to heat 900 grams $H_2O$ and 286 grams of substance and products (80+128 grams NaOH, 9 grams $H_2O$, 59 grams NaCl). Therefore, a total of 1186 grams, total, is the propellant, i.e., $H_2O$ products. The 265 kilo calories per 1186 grams propellant $= .225$ kilo calories/gram of propellent. As a first order approximation it may be said that this amount of heat will increase the temperature of the propellent about 500° F. By increasing the overall temperature of steam products the specific impulse is increased. The specific impulse as a first order approximation is directly proportional to the square root of the temperature, neglecting the beneficial effect of the hydrogen produced.

The following Table II shows the preferred fuels utilized with steam pressurized water in the present invention:

*Table II*

| Reaction | Heat of Formation (kilocalories) (per mole), Hc | Heat of Formation of products (kilocalories/mole), Hp | Net Heat, Hm | Weight, W | Ratio, Hm/W |
| --- | --- | --- | --- | --- | --- |
| $HF+Na$ | 95 | 136 | 41 | 43 | .96 |
| $HF+H_2O$ | 94.86 | 99.40 | 4.54 | | .22 |
| $HCl+Na$ | 22 | 98 | 76 | 59 | 1.3 |
| $HF+Li$ | 95 | 146 | 51 | 27 | 1.89 |
| $HCl+Li$ | 22 | 97 | 75 | 47 | 1.80 |
| $HCl+H_2O$ | | | 17 | 55 | .31 |
| $H_2SO_4+Na$ | 190 | 326 | 136 | 144 | .95 |
| $H_2SO_4+H_2O$ | | | 20 | 116 | .172 |
| $H_2SO_4+Li$ | 190 | 337 | 147 | 112 | 1.31 |
| $Na+H_2O$ | 68 | 102 | 34 | 41 | .83 |
| $Li+H_2O$ | 68 | 116 | 48 | 25 | 1.92 |
| $Mg+H_2O$ | 136 | 219 | 83 | 60 | 1.36 |
| $Mg+H_2SO_4$ | 190 | 301 | 111 | 122 | .92 |
| $Mg+HCl$ | 44 | 153 | 109 | 98 | 1.1 |
| $Mg+H_2O \rightarrow MgO+H_2$ | 68 | 145 | 77 | 42 | 1.83 |
| $Mg+HF$ | 190 | 264 | 74 | 40 | 1.86 |
| $NaH+H_2O$ | 68 | 102 | 34 | 43 | 0.79 |
| $K+H_2O$ | 68 | 102 | 34 | 39 | 0.87 |
| $Rb+H_2O$ | 68 | 101 | 33 | 85 | 0.39 |
| $Cs+H_2O$ | 68 | 100 | 32 | 133 | 0.24 |

It is apparent from Table II that with the primary fuel, steam pressurized water, a secondary reacting substance, i.e., at least one metal such as Li, Na, K, Rb, Cs and Mg or alloys, are mixed and acids such as a halogen acid or sulfuric acid, specifically, hydrochloric, sulfuric or hydrofluoric may be mixed either with the water before introducing the secondary reacting substances or in the nozzle volume essentially simultaneously with the injection of the secondary reacting substances.

Other modifications and combinationss will be apparent to those skilled in the art. Thus, the various modifications and methods of operation described with respect to the preferred embodiment are also applicable to the booster embodiment. Having described a preferred embodiment of the present invention, it is understood that although specific terms and examples are employed, they are used in a generic and descriptive sense and not for the purpose of limitation. The general theory and a mathematical approach set forth herein is based on the best presently known experimental evidence and is included to aid understanding, but is not to be interpreted as binding, since additional experimental data may modify the theory disclosed.

What is claimed is:

1. A reaction-propelled device including a container, means for supporting said container at a preselected angle to the horizontal for flight into the atmosphere, a first closed vessel within said container, at least one second vessel supported by said container adjacent said first vessel, said first vessel containing a fuel, at least a major portion of said fuel consisting of steam-pressurized water, means for heating said steam-pressurized water to a predetermined temperature and pressure, a nozzle connected to one end of said first vessel, first duct means connecting one end of said second vessel to said nozzle, second duct means connecting said first vessel to said second vessel for developing a high pressure in the second vessel, said second duct means being connected at the end of said second vessel opposite the end connection of said first duct means, said second vessel containing at least one fuel-reacting substance which when mixed with said fuel chemically reacts to form a gaseous product of quantity and velocity to impart a specific impulse to said container, means in said nozzle for preventing the chemical reaction of said fuel and said substance, and means for removing said last named means.

2. A reaction-propelled rocket for propulsion through the atmosphere including a first closed vessel containing steam-pressurized water, at least one second vessel containing at least one reaction substance, a nozzle on the first vessel, duct means connecting said first and second vessels to said nozzle, means for mixing said one reaction substance with said steam-pressurized water in said nozzle, a third vessel, said third vessel containing a second reaction substance, duct means connecting said third vessel with said first vessel for conducting the second reaction substance to the first vessel, and means for forcing said first mentioned reaction substance and said second reaction substance from their respective vessels, said last named means including duct means connecting said second and third vessels to said first vessel, means for selectively controlling the flow through said last named duct means and means for injecting said second reaction substance into said first vessel a predetermined time before said steam-pressurized water and said first reaction substances are mixed in said nozzle.

3. The method of operating a rocket having a predetermined amount of steam-pressurized water at a first temperature, including the steps of injecting a first water-reacting substance into said water to raise its temperature to operational temperature higher than said first temperature, ejecting the mixture of water and the reacting substance, and mixing said ejected mixture with a second reacting substance which chemically reacts with both said ejected water and said first water-reacting substance to provide a thrust to propel a device.

4. A reaction-propelled device for propulsion including a base, a first vessel containing steam-pressurized water, said first vessel including a closed forward end and a restricted nozzle portion at its rear end, heating means for the first vessel, said heating means extending through the restricted portion of the first vessel and including a seal for the restricted portion, a second vessel containing a water-reacting substance, a first duct means connecting said second vessel to said first vessel for emitting the water-reacting substance in the area of the nozzle, additional duct means connecting said second vessel with said first vessel, hold-down means for retaining said first vessel in position against said sealing means and upon said base during initial generation of pressure therein, means for releasing the hold-down means to permit the pressure generated in the first vessel by said heating means to escape through the restricted end portion for generating thrust to lift the first vessel from its base and simultaneously permit the introduction of steam and water into the said second vessel to create pressure therein for delivering the reactance material into the first vessel through the first duct means.

5. A reaction-propelled device for propulsion through the atmosphere including a first vessel closed at its upper end for containing steam-pressurized water, a second vessel containing at least one water-reacting substance, a restricted nozzle at the lower end of the first vessel, first duct means connecting the upper end portion of the first vessel and second vessel, second duct means connecting the nozzle portion of said first vessel and the other end portion of the second vessel, said first duct means delivering fluid under pressure from the first vessel to the second vessel and the second of said duct means delivering said water-reacting substance from said second vessel to the nozzle, means initially closing said nozzle, means for heating the first vessel when said nozzle is in closed condition, and means for opening one of said duct means and said nozzle initial closing means by the thrust generated in the first vessel due to the initial heating thereof.

6. The device of claim 5 wherein the first vessel includes a chamber in which the second vessel is located.

7. The device of claim 5 wherein the means for initially closing said nozzle includes valve means releasably insertable into said nozzle for preventing the flow of water and substance into said nozzle.

References Cited in the file of this patent

UNITED STATES PATENTS

| | | |
|---|---|---|
| 2,408,111 | Truax et al. | Sept. 24, 1946 |
| 2,461,797 | Zwicky | Feb. 15, 1949 |
| 2,544,422 | Goddard | Mar. 6, 1951 |
| 2,546,210 | Bittner | Mar. 27, 1951 |
| 2,653,445 | Halford et al. | Sept. 29, 1953 |
| 2,694,898 | Stauff | Nov. 23, 1954 |
| 2,728,191 | Casey | Dec. 27, 1955 |
| 2,927,398 | Kaye et al. | Mar. 8, 1960 |
| 2,974,594 | Boehm | Mar. 14, 1961 |

FOREIGN PATENTS

| | | |
|---|---|---|
| 914,341 | France | June 17, 1946 |
| 602,807 | Great Britain | June 3, 1948 |
| 788,643 | Great Britain | Jan. 2, 1958 |